United States Patent
Clark et al.

(10) Patent No.: US 9,519,719 B2
(45) Date of Patent: *Dec. 13, 2016

(54) RESOURCE MANAGEMENT IN A PRESENTATION ENVIRONMENT

(71) Applicant: International Business Machines Corporation, Armonk, NY (US)

(72) Inventors: Adam T. Clark, Mantorville, MN (US); John S. Mysak, Rochester, MN (US); Aspen L. Payton, Byron, MN (US); John E. Petri, St. Charles, MN (US); Michael D. Pfeifer, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 9 days.

This patent is subject to a terminal disclaimer.

(21) Appl. No.: 14/618,059

(22) Filed: Feb. 10, 2015

(65) Prior Publication Data

US 2016/0232243 A1   Aug. 11, 2016

(51) Int. Cl.
*G06F 15/18*   (2006.01)
*G06F 17/30*   (2006.01)
(Continued)

(52) U.S. Cl.
CPC ....... *G06F 17/30867* (2013.01); *G06F 9/5011* (2013.01); *G06F 17/2785* (2013.01);
(Continued)

(58) Field of Classification Search
None
See application file for complete search history.

(56) References Cited

U.S. PATENT DOCUMENTS 7,110,989 B2 *  9/2006  Iemoto ............... G09B 5/02
                                              706/12
7,783,668 B2 *  8/2010  Vogel ............... G06F 17/30734
                                              707/696
(Continued)

FOREIGN PATENT DOCUMENTS

EP            2202647 A1 *  6/2010  ....... G06F 17/30038

OTHER PUBLICATIONS

Casper, "Casper Focus User Guide, Version 9.3", JAMF Software (http://www.jamfsoftware.com/resources/casper-focus-user-guid-version-9-3), pp. 1-15.*

(Continued)

*Primary Examiner* — Paulinho E Smith
(74) *Attorney, Agent, or Firm* — Jay Wahlquist

(57) ABSTRACT

Aspects of the present disclosure are directed toward managing resources in a presentation environment. Aspects are directed toward collecting, using a set of monitoring devices, context information with respect to a presentation. Aspects are also directed toward determining, based on the context information for the presentation, a subject matter group and a set of access rules for the set of network devices. Aspects are also directed toward identifying, based on the subject matter group, a first set of resources. Aspects are also directed toward establishing, based on the set of access rules and the first set of resources, a first subset of the first set of resources for the set of network devices of the presentation environment.

9 Claims, 4 Drawing Sheets

(51) Int. Cl.
  *G06F 17/27* (2006.01)
  *G06N 99/00* (2010.01)
  *H04L 29/08* (2006.01)
  *G06F 9/50* (2006.01)
  *H04L 12/26* (2006.01)

(52) U.S. Cl.
  CPC .. *G06F 17/30038* (2013.01); *G06F 17/30734* (2013.01); *G06N 99/005* (2013.01); *H04L 43/08* (2013.01); *H04L 67/1095* (2013.01)

(56) References Cited

U.S. PATENT DOCUMENTS

| | | | | |
|---|---|---|---|---|
| 7,908,602 | B2* | 3/2011 | Alcorn | G06Q 30/06 709/219 |
| 8,516,533 | B2* | 8/2013 | Davis | H04N 21/482 725/115 |
| 8,571,538 | B2 | 10/2013 | Sprigg et al. | |
| 8,713,016 | B2* | 4/2014 | Chipman | 707/737 |
| 8,825,858 | B1* | 9/2014 | Atchity | H04L 47/76 709/224 |
| 9,235,693 | B2* | 1/2016 | Kasterstein | G06F 21/121 |
| 9,280,559 | B1* | 3/2016 | Jones | G06F 17/30241 |
| 2003/0233419 | A1* | 12/2003 | Beringer | G06Q 10/107 709/206 |
| 2008/0005138 | A1* | 1/2008 | Gauthier | G06F 17/2247 |
| 2008/0222183 | A1* | 9/2008 | Petri | G06F 17/30929 |
| 2009/0215018 | A1* | 8/2009 | Edmondson | G09B 5/14 434/308 |
| 2011/0301996 | A1* | 12/2011 | Johnson | G06Q 10/06 705/7.26 |
| 2011/0302004 | A1* | 12/2011 | Johnson | G06Q 10/06311 705/7.42 |
| 2012/0231434 | A1* | 9/2012 | Standage | G09B 5/06 434/350 |
| 2012/0278738 | A1 | 11/2012 | Kruse et al. | |
| 2013/0017522 | A1* | 1/2013 | Nguyen | G06Q 10/06 434/322 |
| 2013/0089849 | A1* | 4/2013 | Huang | G09B 5/08 434/352 |
| 2013/0149687 | A1* | 6/2013 | Argott | G09B 7/00 434/351 |
| 2013/0262365 | A1* | 10/2013 | Dolbear | G06N 5/02 706/47 |
| 2013/0344859 | A1* | 12/2013 | Abramson | G06Q 50/265 455/418 |
| 2014/0018048 | A1* | 1/2014 | Anand | H04W 4/003 455/414.1 |
| 2014/0147823 | A1* | 5/2014 | Wolfe | G09B 5/08 434/350 |
| 2014/0207950 | A1* | 7/2014 | Badiee | H04L 43/08 709/224 |
| 2014/0282606 | A1* | 9/2014 | Clark | G06F 9/461 718/108 |
| 2014/0337223 | A1* | 11/2014 | Kapoor | G09B 5/00 705/44 |
| 2015/0079577 | A1* | 3/2015 | Teitelbaum | G09B 7/00 434/353 |
| 2015/0235131 | A1* | 8/2015 | Allen | G06F 17/30654 706/48 |
| 2015/0235132 | A1* | 8/2015 | Allen | G06F 17/30864 706/11 |
| 2015/0304330 | A1* | 10/2015 | Soamboonsrup | G09B 5/08 726/4 |
| 2015/0304484 | A1* | 10/2015 | Halmstad | H04M 1/72577 455/419 |
| 2016/0037333 | A1* | 2/2016 | Amundsen | H04M 1/72577 455/419 |

OTHER PUBLICATIONS

LanSchool, "LanSchool User Guide", Apr. 25, 2014, pp. 1-38.*
Torniai et al, "M-Loco: An Ontology-Based Framework for Context-Aware Mobile Learning", Research Gate, Jan. 2008, pp. 1-11.*
Otaga et al., "Context-Aware Support for Computer-Supported Ubiquitous Learning", 2004, Proceedings of the 2nd IEEE International Workshop on Wireless and Mobile Technologies in Education (WMTE '04), pp. 1-9.*
Wang, "Context Awareness and Adaptation in Mobile Learning", 2004, WMTE, pp. 1-5.*
Berri, "Ontology-Based Framework for Context-Aware Mobile Learning", Jul. 6, 2006, pp. 1307-1310.*
Adams, D. "Wireless Laptops in the Classroom (and the Sesame Street Syndrome)", Communications of the ACM, Sep. 2006. vol. 49, No. 9. pp. 25-27. © 2006 ACM 0001-0782/06/0900.
Apple, "Teacher's Assistant Pro: Track Student Behavior", Lesson Portal, LLC. https://itunes.apple.com/us/app/teachers-assistant-pro-track/id391643755?mt=8 Copyright © 2014 Apple Inc.
Brubaker, A., "Faculty Perceptions of the Impact of Student Laptop Use in a Wireless Internet Environment on the Classroom Learning Environment and Teaching". A Master's Paper for the M.S. in I.S. degree. Nov. 2006. Chapel Hill, NC. 104 pages.
Clark, A., et al. "Intelligent Governance Controls Based on Real-Time Contexts" U.S. Appl. No. 14/618,094, filed Feb. 10, 2015.
Fang, B. "From Distraction to Engagement: Wireless Devices in the Classroom", EDUCAUSEreview online. Published Dec. 22, 2009. http://www.educause.edu/ero/article/distraction-engagement-wireless-devices-classroom Last accessed Nov. 19, 2014, 6:59 PM. 12 pages.
Lai, E. "Chart: Top 100 iPad Rollouts by Enterprises & Schools", Forbes Brand Voice, Updated Oct. 16, 2012. http://www.forbes.com/sites/sap/2012/08/31/top-50-ipad-rollouts-by-enterprises-schools/ Last accessed Dec. 23, 2014. 12:05PM.
McCabe, M. et al. "Teaching with CAA in an Interactive Classroom" Jun. 10, 2003. Department of Mathematics, University of Portsmouth. 12 pages.
Netop "Classroom Management Solutions: iPads in School" Netop Classroom Managment. http://www.netop.com/classroom-management-software/results/ipads-in-schools.htm Last accessed Dec. 23, 2014, 11:59AM.
Stolle, M. "Rochester school district seeks iPad for each student", The Post-Bulletin, Posted Jun. 19, 2012, 9:01AM. http://www.postbulletin.com/news/local/rochester-school-district-seeks-ipad-for-each-student/article_e1f0acdc-81ba-55b7-b527-b14f41237220.html.
Unknown, "A better classroom for students, teachers, and IT administrators", Casper Focus http://www.jamfsoftware.com/products/casper-focus/ Copyright © JAMF Software, LLC 2002-2014.
Unknown, "Cecily uses ClassDojo to build positive behavior with her students", https://www.classdojo.com/ Last accessed: Dec. 23, 2014 11:55 AM.
Unknown, "Visualizing student understanding has never been clearer", MasteryConnect. http://www.socrative.com/ © 2014 Socrative.com Last accessed:Dec. 23, 2014 11:57 AM.
Wang, Y. "Context Awareness and Adaptation in Mobile Learning", Proceedings of the 2nd IEEE International Workshop on Wireless and Mobile Technologies in Education (WMTE'04) 0-7695-1989-X/04. © 2004 IEEE.
IBM "List of IBM Patents or Patent Applications Treated as Related".
Clark, A., et al., "Resource Management in a Presentation Environment", U.S. Appl. No. 14/672,472, filed Mar. 30, 2015.
List of IBM Patents or Patent Applications Treated as Related.

* cited by examiner

RESOURCE MANAGEMENT IN A PRESENTATION ENVIRONMENT

BACKGROUND

The present disclosure relates to computer systems, and more specifically, to managing resources in a presentation environment.

The amount of data available on the Internet and other communication networks is growing rapidly. Resources including audio data, video data, textual data, and other hardware features and software content are examples of resources available to users. As the amount of available resources and information increase, the need for managing these resources may also increase.

SUMMARY

Aspects of the present disclosure, in certain embodiments, are directed toward managing resources in a presentation environment. Aspects are also directed toward collecting, using a set of monitoring devices, context information with respect to a presentation. Aspects are also directed toward determining, based on the context information for the presentation, a subject matter group and a set of access rules for the set of network devices. In certain embodiments, aspects are also directed toward identifying, based on the subject matter group, a first set of resources. Aspects are also directed toward establishing, based on the set of access rules and the first set of resources, a first subset of the first set of resources for the set of network devices of the presentation environment.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
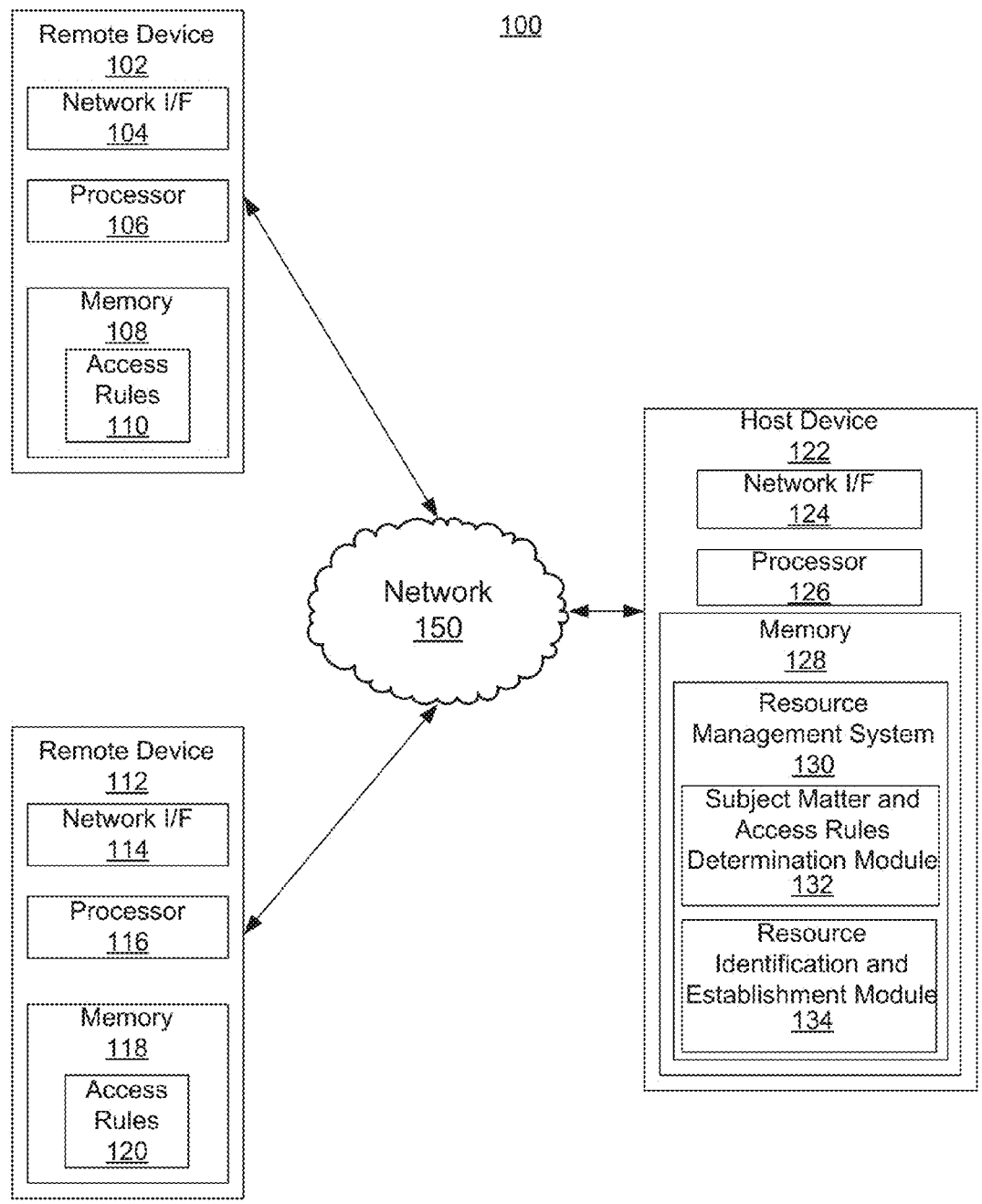
FIG. 1 is a diagrammatic illustration of an example computing environment, according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to various embodiments of a system and method for managing resources in an environment. More particular aspects relate to determining a subject matter group and a set of access rules for a set of network devices of the environment. The method may include collecting, using a set of monitoring devices, context information with respect to a presentation. The method may also include determining, based on the context information for the presentation, a subject matter group and a set of access rules for the set of network devices. The method may also include identifying, based on the subject matter group, a first set of resources. The method may also include establishing, based on the set of access rules and the first set of resources, a first subset of the first set of resources for the set of network devices of the presentation environment.

In recent years, the increased availability and access to information and technology have impacted the manner in which individuals teach, learn, and communicate to one another. In particular, presentation environments (e.g., an environment wherein one or more individuals is instructing or imparting information to one or more listeners) are one example of a situation that can make great use of the increased access to information and technology available today. Aspects of the present disclosure, however, relate to the recognition that not all the resources (e.g., information or data on Internet and other networks, as well as software and hardware features of an electronic device) available to a user are necessarily relevant or appropriate at all times. For instance, in a presentation environment such as a school classroom, auditorium hosting an academic talk, or other such situation, it may be desirable to manage the resources available to a user in order to facilitate their ability to access content that is relevant and appropriate to the presentation. Accordingly, aspects of the present disclosure are directed toward collecting context information about a presentation and developing a set of access rules for the electronic device to manage the resources accessible to a user. Further aspects of the present disclosure are directed toward providing relevant content and resources to the user. Aspects of the present disclosure may be associated with benefits including content relevance, time saving, and efficiency of content accessibility.

Aspects of the present disclosure relate to various embodiments of a system and method for managing resources in an environment. More particular aspects relate to determining a subject matter group and a set of access rules for a set of network devices of the environment. The method and system may work on a number of devices and operating systems. Aspects of the present disclosure, in certain embodiments, include collecting, using a set of monitoring devices, context information with respect to a presentation. The set of monitoring devices may include microphones, video cameras, and the like. The context information may include audio data, image data, and video data. In certain embodiments, the environment may be a classroom, and the presentation may be a lecture delivered to students by a teacher.

In certain embodiments, the method may include determining, based on the context information for the presentation, a subject matter group and a set of access rules for the set of network devices. Determining the subject matter group may include parsing, by a natural language processing technique configured to analyze syntactic and semantic content, the audio data, image data, and video data to identify a first concept. By comparing the first concept to an ontology framework, the method may include identifying a set of related concepts. In certain embodiments, determining the subject group may include grouping the first concept and the set of related concepts into the subject matter group. In certain embodiments, determining the set of access rules may include identifying, by analyzing the subject matter group, a set of relevant functions of the network devices with respect to the subject matter group. Based on the context information and the set of relevant functions of the network devices, the method may include generating the set of access rules for the set of network devices.

In certain embodiments, the method may include identifying, based on the subject matter group, a first set of resources. In certain embodiments, the first set of resources may include a system hardware resources (e.g., RAM, CPU), a software application (e.g., calculator function, weather application), a subject matter corpus (e.g., digital encyclopedia), a network search feature or the like. The subject matter corpus may, for instance, include textual data, image data, audio data, and video data pertaining to the subject matter. In certain embodiments, more than one of the above-mentioned items may be selected as the first set of resources.

In certain embodiments, the method may include establishing, based on the set of access rules and the first set of resources, a first subset of the first set of resources for the set of network devices of the presentation environment. Establishing the first subset of the first set of resources for the set of network devices may include filtering, by applying the set of access rules to the first set of resources, a first portion from the first set of resources. In response to filtering the first portion of the first set of resources, the method may include determining a second portion of the first set of resources as the first subset. Further, in certain embodiments, in response to filtering the first portion from the first set of resources, a third portion of the first set of resources may be determined as a second subset. The method may then include allocating the first subset to a first network device of the set of network devices, and allocating the second subset to a second network device of the set of network devices.

In certain embodiments, the method may include determining a second subject matter group and a second set of access rules for the set of network devices based on the context information. The method may then identify a second set of resources based on the second subject matter group, and establish a subset of the second set of resources for the set of network devices of the presentation environment. The method may also allocate the subset of the second set of resources to the set of network devices.

In certain embodiments, the method may include identifying a first objective for a network device of the set of network devices. Identifying the first objective for the network device may be based on the context information for the presentation. The method may include determining an efficiency factor for the set of access rules based on evaluating a progress status of the first objective. In response to determining that the efficiency factor is less than a first efficiency threshold, the method may include modifying the set of access rules. The method may also include receiving, in response to evaluating the progress status of the first objective, a set of user ratings for the set of access rules. The method may also include defining, using a machine learning technique configured to process the set of user ratings for the set of access rules, a decision parameter for generating the set of access rules.

Turning now to the figures, FIG. 1 is a diagrammatic illustration of an example computing environment 100, consistent with embodiments of the present disclosure. In certain embodiments, the environment 100 can include one or more remote devices 102, 112 and one or more host devices 122. Remote devices 102, 112 and host device 122 may be distant from each other and communicate over a network 150 in which the host device 122 comprises a central hub from which remote devices 102, 112 can establish a communication connection. Alternatively, the host device and remote devices may be configured in any other suitable relationship (e.g., in a peer-to-peer or other relationship).

In certain embodiments the network 150 can be implemented by any number of any suitable communications media (e.g., wide area network (WAN), local area network (LAN), Internet, Intranet, etc.). Alternatively, remote devices 102, 112 and host devices 122 may be local to each other, and communicate via any appropriate local communication medium (e.g., local area network (LAN), hardwire, wireless link, Intranet, etc.). In certain embodiments, the network 150 can be implemented within a cloud computing environment, or using one or more cloud computing services. Consistent with various embodiments, a cloud computing environment can include a network-based, distributed data processing system that provides one or more cloud computing services. In certain embodiments, a cloud computing environment can include many computers, hundreds or thousands of them, disposed within one or more data centers and configured to share resources over the network.

In certain embodiments, host device 122 can include a resource management system 130 having a subject matter and access rules determination module 132 and a resource identification and establishment module 134. In certain embodiments, the subject matter and access rules determination module 132 may be configured to parse context information for a presentation (e.g., lecture, speech) to identify a first concept, identify a set of related concepts for the first concept using an ontology framework, and grouping the first concept and the set of related concepts into a subject matter group. Additionally, in certain embodiments, the subject matter and access rules determination module 132 may be configured to identify a set of relevant functions of one or more network devices based on the subject matter group, and generate a set of access rules for the set of network devices based on the context information and the set of relevant functions of the set of network devices. The resource identification and establishment module 134 may be configured to use the subject matter group identified by the subject matter and access rules determination module 132 to identify a set of resources, and use the set of access rules to determine a portion of the set of resources to allocate to the set of network devices.

In certain embodiments, remote devices 102, 112 may include an access rules module 110, 120. The access rules module 110, 120 may be configured to communicate with the host device 122, receive access rules, and apply them to the remote device 102, 112. In certain embodiments, as described herein, the access rules module 110, 120 may be used to establish a subset of a first set of resources for the remote device 102, 112. In certain embodiments, the access rules module 110, 120 may be configured to provide feedback data (e.g., modifications to the access rules, user ratings) to the host device 122.

Consistent with various embodiments, host device 122 and remote devices 102, 112 may be computer systems preferably equipped with a display or monitor. In certain embodiments, the computer systems may include at least one processor 106, 116, 126 memories 108, 118, 128 and/or internal or external network interface or communications devices 104, 114, 124 (e.g., modem, network cards, etc.), optional input devices (e.g., a keyboard, mouse, or other input device), and other commercially available and custom software (e.g., browser software, communications software, server software, natural language processing software, search engine and/or web crawling software, filter modules for filtering content based upon predefined criteria, etc.). In certain embodiments, the computer systems may include server, desktop, laptop, and hand-held devices. In addition, the resource management system 130 may include one or more modules or units to perform the various functions of present disclosure embodiments described below (e.g., collecting context information with respect to a presentation, determining a subject matter group and a set of access rules for a set of network devices, identifying a first set of resources, and establishing a first subset of the first set of resources based on the set of access rules and the first set of resources) and may be implemented by a combination of other software and/or hardware modules or units.

Figure 2:
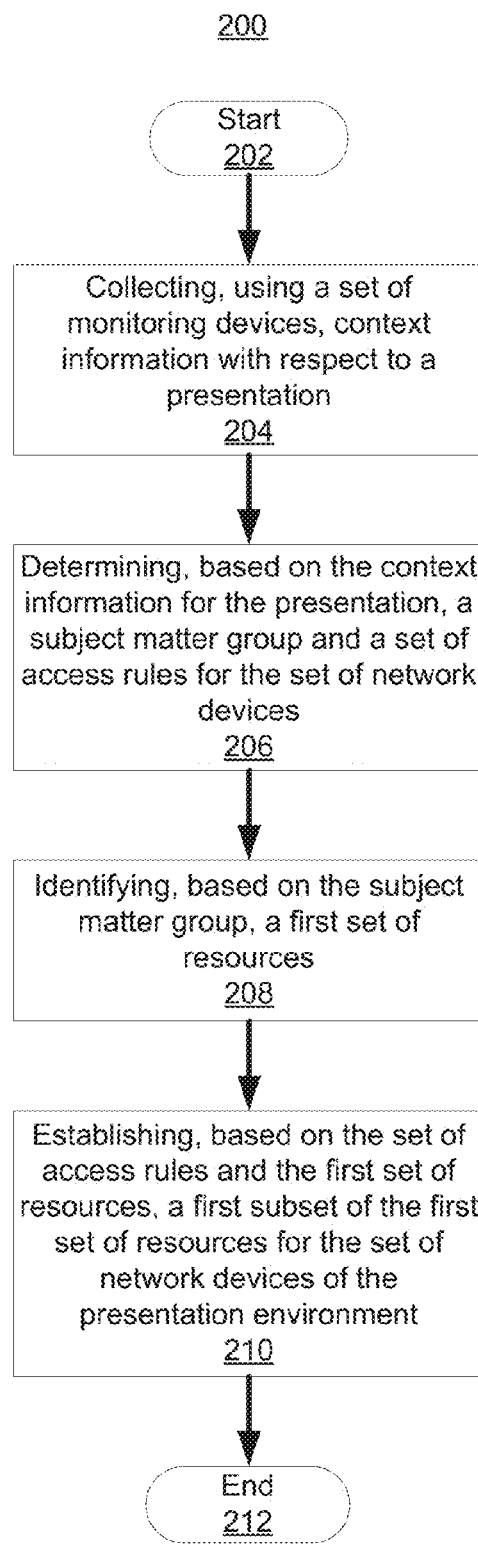
FIG. 2 is a flowchart illustrating a method for managing resources in an environment, according to embodiments.

FIG. 2 is a flowchart illustrating a method 200 for managing resources in an environment, consistent with embodiments of the present disclosure. Aspects of FIG. 2 are directed toward determining a subject matter group and a set of access rules for a set of network devices based on context information for a presentation. The method 200 may begin at block 202 and end at block 212. Consistent with various embodiments, the method 200 may include a collecting block 204, a determining block 206, an identifying block 208, and an establishing block 210.

Consistent with various embodiments, at block 204 the method 200 may include collecting, using a set of monitoring devices, context information with respect to a presentation. The set of monitoring devices may, for instance, include cameras, microphones, motion sensors, infrared sensors, and other devices configured to collect data about the surrounding environment. In certain embodiments, the set of monitoring devices may be stationed in an environment where a presentation is being performed. For example, the set of monitoring devices may be located in a school classroom where a teacher is presenting a lecture to a group of students, an auditorium where a speaker is delivering an address to an audience, a meeting room where a company president is speaking to investors, or the like. Additionally, aspects of the present disclosure are directed toward collecting context data for a presentation in a virtual environment (e.g., online classroom/coursework). In certain embodiments, the set of monitoring devices may be configured to collect context information with respect to a presentation. The context information may include data regarding the circumstances, substance, content, environment, and other aspects of the presentation. For example, in certain embodiments, the context information may include audio data, video data, and image data regarding the presentation. More particularly, the context information may include a still image (e.g., photograph of the presentation environment, classroom, or virtual classroom), audio recording (e.g., a portion of the presentation) and a video recording (e.g., of the speaker.) The context information may also include textual data, such as handwritten notes, message board posts, or the like. In certain embodiments, the monitoring devices may be configured to directly interface with a presentation device of the speaker. For instance, the monitoring devices may be configured to receive a direct feed of a presentation slideshow, video, images, or other presentation materials (e.g., the monitoring devices may receive a presentation slideshow running on a tablet or computer of the speaker). Such a configuration may provide benefits associated with simplifying the collection of context data.

Aspects of the present disclosure, in certain embodiments, are directed toward allocating resources to a set of network devices using a determined subject matter group of the presentation and a set of access rules. Accordingly, using the subject matter group and the set of access rules, resources that are relevant and appropriate for the presentation may be identified and allocated to the set of network devices, providing benefits associated with content relevancy and usability. Consistent with various embodiments, at block 206 the method 200 may include determining a subject matter group and a set of access rules for the set of network devices. The subject matter group and the set of access rules may be determined based on the context information for the presentation. In certain embodiments, the set of network devices may include computers, tablets, smart phones, or other electronic devices communicatively connected to the set of monitoring devices. As an example, the set of network devices may include tablet computers that are connected to the set of monitoring devices via a Wi-Fi, Bluetooth, or other type of connection. The set of network devices may be used by audience members to access media that is relevant to the presentation, or to participate directly in the presentation (e.g., surveys, responses to questions posed by the presenter).

As described herein, in certain embodiments, the subject matter group may be determined based on the context information for the presentation. Determining the subject matter group may include parsing the context information using a natural language processing technique. The natural language processing technique may be configured to parse both structured (e.g., tables, graphs) and unstructured data (e.g., textual content containing words, numbers, dates). In certain embodiments, the natural language processing technique may be a software tool, widget, or other program configured to analyze and identify the semantic and syntactic elements and relationships present in the context information (e.g., the audio data, image data, and video data) for the presentation. More particularly, the natural language processing technique can be configured to parse the grammatical constituents, parts of speech, context, and other relationships (e.g., modifiers) of the context information. The natural language processing technique can be configured to recognize keywords, context information, and metadata tags associated with words, phrases, or sentences in the context information. In certain embodiments, the natural language processing technique can analyze summary information, keywords, figure captions, or text descriptions included in the context information, and identify syntactic and semantic elements present in this information. The syntactic and semantic elements can include information such as word frequency, word meanings, text font, italics, hyperlinks, proper names, noun phrases, parts-of-speech, or the context of surrounding words. Other syntactic and semantic elements are also possible.

Based on the parsed syntactic elements, semantic elements, and other features of the context information, the method 200 can include identifying a first concept of the presentation. The first concept may, for instance, be a subject, topic, idea, or the like, identified based on the semantic and syntactic content of the presentation. As examples, in certain embodiments, the first concept may be identified as "Humboldt squids," "quantum teleportation," or "bee colony development." In addition to the examples referenced explicitly herein, a variety of other first concepts are also possible. In certain embodiments, in response to identifying the first concept of the presentation, the method 200 may include comparing the first concept to an ontology framework to identify a set of related concepts. The ontology framework may be a web or network of structured relationships that may be organized such that related concepts are linked together.

In certain embodiments, the ontology framework may be used to identify concepts that are similar in subject matter to the first concept. For example, with reference to the examples mentioned above, for a first concept of "quantum teleportation" the method 200 may identify related concepts of "quantum tunneling," "quantum computing," while for a first topic of "Humboldt Squid" the method 200 may identify related concepts of "Giant Squid" and "Colossal Squid." In response to identifying the set of related concepts, the method 200 may include grouping the first concept and the set of related concepts into a subject matter group. The subject matter group may be a division or class or concepts that encompasses the first concept and the related concepts. For instance, for a first concept of "quantum teleportation" and related concepts of "quantum tunneling" and "quantum computing," the method 200 may group the first concept and the related concepts into a subject matter group of "quantum physics." In addition to those referenced explicitly herein, a variety of related concepts and subject matter groups are possible.

As described herein, aspects of the present disclosure, in certain embodiments, are directed toward determining a set of access rules for the set of network devices. The set of access rules may be used to facilitate a user's search for resources that are relevant and appropriate to the presentation. Generally, the set of access rules may be principles, guidelines, facts, or other indications that can be used to direct a user toward resources that are relevant to the presentation, and guide them away from less relevant content. The resources may include system functions and hardware resources of the set of network devices (e.g., RAM, CPU, network bandwidth, storage space) as well as media content/data (e.g., articles, videos, images, encyclopedia entries), software (e.g., programs, applications, games), and the like.

In certain embodiments, at block 206 the method 200 may include analyzing the subject matter group to identify a set of relevant functions of the network devices with respect to the subject matter group. Generally, the functions of the network devices may include both hardware and software operations configured to be executable by the network devices. As examples, the functions of the network devices may include volume controls, on/off controls, messaging applications, internet browser applications, calculator functions, dictionaries, setting/preference functions, map software, weather applications, games, and other hardware and software features of the network devices.

Accordingly, as described herein, the method 200 may include identifying a set of relevant functions of the network devices with respect to the subject matter group. In certain embodiments, the set of relevant functions may be pertinent, useful, appropriate, or otherwise relevant to the subject matter group. As an example, for an identified subject matter group of "arithmetic," the method 200 may include identifying a calculator application as a relevant feature. For an identified subject matter group of "Animals and Habitats around the World" the method 200 may include identifying an internet browser, map software, and weather applications as relevant functions with respect to the subject matter group. In certain embodiments, identifying the relevant functions of the network device may include analyzing particular software or hardware features of the network device, and determining sub-functions of particular applications that are relevant to the subject matter group. For example, in certain embodiments, the method 200 may include analyzing a calculator application of the network device, and determining that "sine," "cosine," and "tangent" operations of the calculator are relevant to an identified subject matter group of "Trigonometry."

Based on the context information for the presentation and the set of relevant functions of the set of network devices, at block 206 the method 200 may include generating the set of access rules for the set of network devices. As described herein, generally, the set of access rules may be principles, guidelines, facts, or other indications that can be used to direct a user toward resources that are relevant to the presentation, and guide them away from less relevant content. In certain embodiments, generating the set of access rules may include limiting access to one or more software or hardware features of the network device that were not identified as relevant functions with respect to the subject matter group. For instance, referring again to the example wherein a subject matter group of "arithmetic" was identified along with a relevant function of a calculator application, an access rule may be generated that restricts a user of the network device from using a dictionary application or a typing game application (e.g., the dictionary application and the typing game application are not substantially relevant to a subject matter group of "arithmetic.")

As described herein, in certain embodiments, access rules may be generated for the sub-functions of particular features of the network devices. For example, in certain embodiments, an access rule may be generated that permits a user to make use of an internet search function, but restricts access to a video search feature of the search function. In certain embodiments, access rules may be generated to narrow the scope of a user's search in order to direct them to content relevant to the presentation. As an example, in a situation where a subject matter group has been identified as "electromagnetism," and a user performs a search (e.g., using an internet search engine, a search command in a digital corpus of information, or the like) for "waves," the method 200 may restrict access to content (e.g., articles, videos, images) related to "ocean waves" (e.g., ocean waves are less likely to be relevant to a presentation on "electromagnetism" than other types of waves may be).

Consistent with various embodiments, at block 208 the method 200 may include identifying a first set of resources. In certain embodiments, the first set of resources may be identified based on the subject matter group. As described herein, the first set of resources may include system functions and hardware resources of the set of network devices (e.g., memory, storage, power, network bandwidth) as well as media content/data (e.g., articles, videos, images, corpora), software (e.g., programs, applications), and the like. Identifying the first set of resources may include using the resulting output of the natural language processing technique (e.g., in response to parsing the context information of the presentation) as well as the identified relevant functions of the network devices to ascertain appropriate resources. For example, for an identified subject matter group of "Bessel Functions" the method 200 may include identifying an online corpus of integration tables (e.g., to assist a user in performing integral operations), an article regarding the history, development, and applications of various types of integrals (e.g., to provide a user with a conceptual understanding of the significance of Bessel Functions), a scientific calculating function (e.g., to perform integral operations for a user), and an approximate memory allocation (e.g., complex integrals may require dedicated memory allocation).

Consistent with various embodiments, at block 210 the method 200 may include establishing a first subset of the first set of resources for the set of network devices of the presentation environment. The first subset of the first set of resources may be established based on the set of access rules and the first set of resources. Generally, establishing the first subset of the first set of resources may include allocating, assigning, or otherwise providing a portion of the first set of resources to the set of network devices. The first subset of the first set of resources may, in certain embodiments, be a portion of the first set of resources that is substantially relevant, significant, or appropriate with respect to the presentation. In certain embodiments, the first subset of the first set of resources may include the entire first set of resources.

In certain embodiments, establishing the first subset of the first set of resources may include filtering a first portion from the first set of resources. The first portion may, for instance, be content, features, functions, or other types of resources that are not substantially relevant or appropriate for the presentation. In certain embodiments, the first portion may be filtered by applying the set of access rules to the first set of resources. Consider, for instance, a scenario in which a presentation has an identified a subject matter group of "Etymology of the English Language" and a first set of resources is identified that includes a comprehensive history of the development of many Germanic languages. Accordingly, the method 200 may include applying an access rule (e.g., of a set of access rules determined based on context information for the presentation) to filter a first portion from the first set of resources (e.g., the first portion may be a portion that deals with the etymology of non-English Germanic languages, such as Danish, Icelandic, and Norwegian). In response to filtering the first portion from the set of resources, the method 200 may include determining a second portion (e.g., a portion that is relevant to the history, development, and etymology of the English language) of the first set of resources as the first subset. As described herein, the first subset of the first set of resources may be provided to the set of network devices.

Aspects of the present disclosure, in certain embodiments, are directed toward providing different resources to different devices of the set of network devices. For example, at block 210 the method 200 may include determining a third portion of the first set of resources as a second subset, and allocating the first subset to a first network device and the second subset to a second network device. In certain embodiments, determining the resources to allocate to each network device may include analyzing a user profile for a user of a particular network device. The user profile may include information regarding the occupation, hobbies, interests, educational background, experiences, strengths and weaknesses, school performance, and other information about the user.

In certain embodiments, the method 200 may include determining a portion of resources to allocate to a network device based on the context information of the presentation, the generated set of access rules, and information from a user profile (e.g., interests). As an example, for a presentation with an identified subject matter topic of "Geology," the method 200 may determine, using user profile information, that a first user is interested in studying earthquakes, while a second user is interested in studying climate change. Accordingly, resources regarding earthquakes (e.g., articles on significant earthquakes in the past, first-hand accounts of seismic activity) may be identified for the first user, and resources regarding climate change (e.g., carbon emission data, graphs of temperatures versus time over long periods) may be identified for the second user. Accordingly, as described herein, the set of access rules may be applied to filter the resources before they are allocated to the users. For instance, an access rule may be generated that indicates that resources regarding the potential causes of climate change are relevant with respect to the presentation, but resources regarding speculation about possible effects of climate change are not relevant to the presentation.

Aspects of the present disclosure relate to the recognition that, in certain embodiments, the topic of the presentation may change as it progresses, and that the set of access rules originally generated for the presentation may be less applicable. Accordingly, in certain embodiments, aspects of the present disclosure are directed toward dynamically updating the set of access rules based on the flow of the presentation. More specifically, the method 200 may include generating a second set of access rules for the set of network devices based on the context information for the presentation. The second set of access rules may be generated in response to providing the first subset of the set of resources to the network devices. The process of generating the second set of access rules may substantially correspond with the process of generating the first set of access rules, as described herein. Accordingly, the method 200 may include identifying a second set of resources, and establishing a subset of the second set of resources for the set of network devices. The subset of the second set of resources may be allocated to the set of network devices.

Consider the following example. A professor may be giving an academic talk with an identified subject matter group of "Atmospheric Phenomena." The audience may be listening to the talk, and following the presentation materials on network devices such as laptop computers, tablets, smartphones, and the like. The professor may begin by speaking about atmospheric phenomena observed in Earth's atmosphere. Accordingly, the method 200 may determine, based on analyzing presentation slides as well as a voice recording of the speaker, a set of access rules. For instance, in certain embodiments, the method 200 may include generating a rule that restricts access to content (e.g., articles, videos, data corpora) that uses the term "atmosphere" as it relates to the pervading mood or emotional tone of a location (e.g., the speaker is using the term atmosphere in a scientific context, and other uses of the term atmosphere may not be substantially relevant to the presentation). Further, the method 200 may include generating a rule that restricts access to content that pertains to atmospheric phenomena of non-Earth locations (e.g., the atmospheric phenomena of Saturn may not be substantially relevant to the presentation).

Using the generated set of access rules and the context information for the presentation, the method 200 may include identifying and establishing resources for the set of network devices. In certain embodiments, the resources may include suggested links to internet articles about the Earth's atmosphere, videos of the aurora *borealis* (e.g., example atmospheric phenomena) computer-generated visual simulations of hurricane formations, and additional RAM to facilitate the operation of the simulations. As described herein, in certain situations, the topic of the presentation may transition from atmospheric phenomena in Earth's atmosphere to atmospheric phenomena observed in the Martian atmosphere. Accordingly, the method 200 may include using the context information for the presentation (e.g., presentation slides, audio cues from the speaker) to detect the topic transition, and generate a second set of access rules for the set of network devices. For instance, the method 200 may include generating a rule that restricts access to content that pertains to Earth's atmosphere. The method 200 may then use the set of access rules and the context information for the presentation to identify and establish resources that are relevant to the current topic of the presentation (e.g., Martian atmospheric phenomena).

Figure 3:
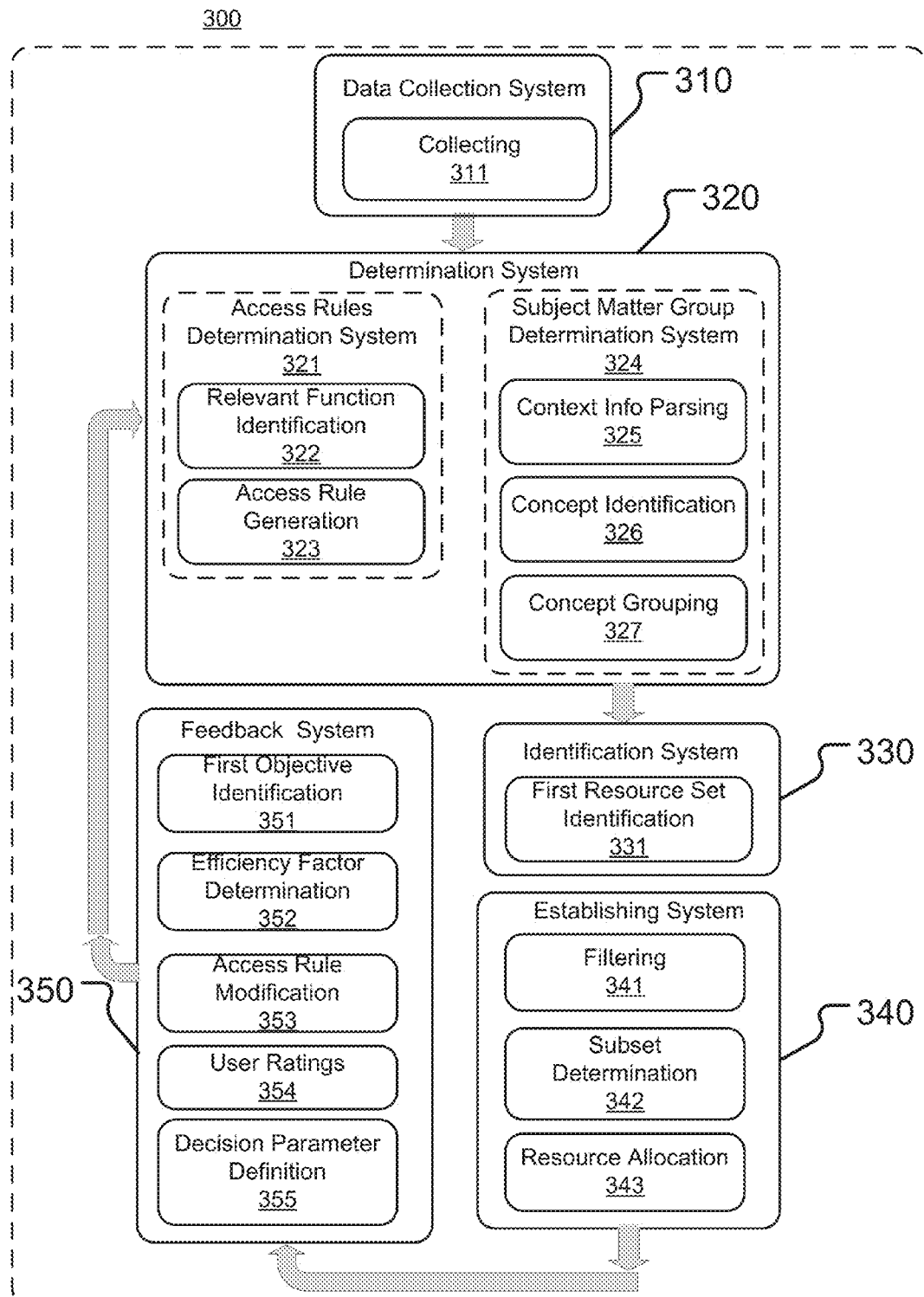
FIG. 3 is a diagram illustrating an example system architecture for managing resources in an environment, according to embodiments.

FIG. 3 is a diagram illustrating an example system architecture 300 for managing resources in an environment, consistent with embodiments of the present disclosure. As shown in FIG. 3, the system architecture 300 may include a data collection system 310, a collecting module 311, a determination system 320, an access rules determination system 321, a relevant function identification module 322, an access rule generation module 323, a subject matter group determination system 324, a context info parsing module 325, a concept identification module 326, a concept grouping module 327, an identification system 330, a first resource set identification module 331, an establishing system 340, a filtering module 341, a subset determination module 342, a resource allocation module 343, a feedback system 350, a first objective identification module 351, an efficiency factor determination module 352, an access rule modification module 353, a user ratings module 354, and a decision parameter definition module 355.

Aspects of FIG. 3 are directed toward a system architecture 300 for using context data collected for a presentation and a set of access rules for a set of network devices in order to manage the content available to a user. As shown in FIG. 3, the system architecture 300 may include a data collection system 310. The data collection system 310 may include a collecting module 311 configured to collect context information with respect to a presentation. The context information may include image, audio, video, or textual content, and be collected using a set of monitoring devices (e.g., cameras, microphones, and the like). In certain embodiments, the collecting module 311 may substantially correspond with block 204 of FIG. 2.

In certain embodiments, the system architecture 300 may include a determination system 320. The determination system 320 may substantially correspond with block 206 of FIG. 2. The determination system may include an access rules determination system 321 and a subject matter determination system 324. The subject matter group determination system 324 may be configured to identify a group of concepts or ideas that are related to the presentation. Accordingly, the context info parsing module 325 may be configured to use a natural language processing technique configured to analyze and parse the context information gathered by the collecting module 311. Based on the parsing performed by the natural language processing technique, the concept identification module 326 may be configured to identify a first concept (e.g., a primary subject or topic of the presentation) as well as a set of related concepts (e.g., secondary topics or subjects). The concept grouping module 327 may group the first concept together with the set of related concepts as the subject matter group.

In certain embodiments, the system architecture 300 may include an identification system 330. The identification system 330 may substantially correspond with block 208 of FIG. 2. The identification system 330 may include a first resource set identification module 331. In certain embodiments, the first resource set identification module 331 may use the subject matter group determined by the subject matter group determination system 324 to identify a first set of resources. The first set of resources may include system functions and hardware resources of the set of network devices (e.g., RAM, CPU, network bandwidth, storage space) as well as media content/data (e.g., articles, videos, images, encyclopedia entries), software (e.g., programs, applications, games), and the like.

In certain embodiments, the system architecture 300 may include an establishing system 340. The establishing system 340 may substantially correspond with block 210 of FIG. 2. In certain embodiments, the filtering module 341 may be configured to apply the set of access rules to the first set of resources, and filter a portion of the set of resources (e.g., the portion may not be substantially relevant or appropriate with respect to the presentation). The subset determination module 342 may classify the remaining resources (e.g., the portion of the resources that is substantially important, relevant, or appropriate with respect to the presentation) as the subset. The resource allocation module 343 may be configured to allocate or provide the subset of the first set of resources to one or more of the network devices.

Aspects of the present disclosure, in certain embodiments, are directed toward using a feedback system 350 to update, modify, revise, or otherwise manage the generation of access rules. As shown in FIG. 3, in certain embodiments the feedback system 350 may include a first objective identification module 351. The feedback system 350 may be communicatively connected to the determination system 320. The first objective may include a goal, aim, or purpose of a user of a network device. As an example, in certain embodiments, the first objective may be "modeling the migration habits of Monarch butterflies." In certain embodiments, the first objective may be determined based on the context information for the presentation (e.g., the speaker describes modeling the migration habits of Monarch butterflies as a goal of his/her research). In certain embodiments, the first objective may be entered manually by a user (e.g., the user specifies his/her goal for the current session of using the network device.)

The system architecture 300 may also include an efficiency factor determination module 352. The efficiency factor may be a quantitative indication of the progress of the user in achieving the first objective, and represent the effectiveness of the current set of access rules. In certain embodiments, the efficiency factor may be determined by evaluating a progress status of the first objective. The progress status may be manually input by a user (e.g., the system may query whether the user has found what he or she is searching for), or may be determined dynamically based on the searching habits of a user (e.g., a user who repeatedly submits many search queries to a search engine may be determined to have not achieved his or her objective, while a user who searches just once and ends the session may be determined to have accomplished his or her objective.) As described herein, based on the progress status of the first objective, the efficiency factor determination module 352 may determine an efficiency factor for the set of access rules. In certain embodiments, the efficiency factor may be an integer value between 1 and 100, wherein greater numbers indicate that the set of access rules are substantially effective in providing the user with resources relevant to the presentation, and lesser numbers indicate that the set of access rules were not effective in providing the user with useful or relevant resources.

Accordingly, in certain embodiments, the access rule modification module 353 may compare the efficiency factor to a first efficiency threshold. In response to determining that the efficiency factor is below the first efficiency threshold, the access rule modification module 353 may include modifying the set of access rules. For example, in certain embodiments, the access rule modification module 353 may revise the access rules to be less restrictive (e.g., the access rules may have been too strict, filtering out potentially relevant content) or more restrictive (e.g., the access rules may not have been strict enough, resulting in extraneous, non-relevant content.) In addition to the examples referenced specifically herein, other methods of revising the set of access rules are also possible.

In certain embodiments, the user ratings module 354 may be configured to collect a set of user ratings for the set of access rules. In certain embodiments, the set of user ratings may be collected in response to evaluating the progress status of the first objective. Generally, the set of user ratings may include quantitative or qualitative assessments, perspectives, and opinions on the efficacy of the set of access rules. In certain embodiments, the set of user ratings may be collected by providing the user of the network device with a survey or other user interface configured to collect the set of user ratings. The decision parameter definition module 355 may be configured to use a machine learning technique to process and analyze the set of user ratings for the set of access rules, and define a decision parameter for generating the set of access rules.

The machine learning technique may, in certain embodiments, be an association rule learning algorithm. The machine learning technique may use the gathered set of user ratings to recognize patterns and develop relationships between the access rules that are preferred by a user and the access rules that are associated with substantially high efficacy factors (e.g., access rules may be developed that are both desirable to users and effective in facilitating access to content relative to the presentation). Accordingly, the decision parameter definition module 355 may define a decision parameter that can be used to generate more effective access rules by the access rule generation module 323. As an example, in certain embodiments, a decision parameter may be generated that indicates that some users may prefer access rules that are less restrictive in favor of access rules that are more restrictive (e.g., the presence of some non-relevant resources may be preferable to resources that are too narrow in scope). Other types of decision parameters are also possible.

Figure 4:
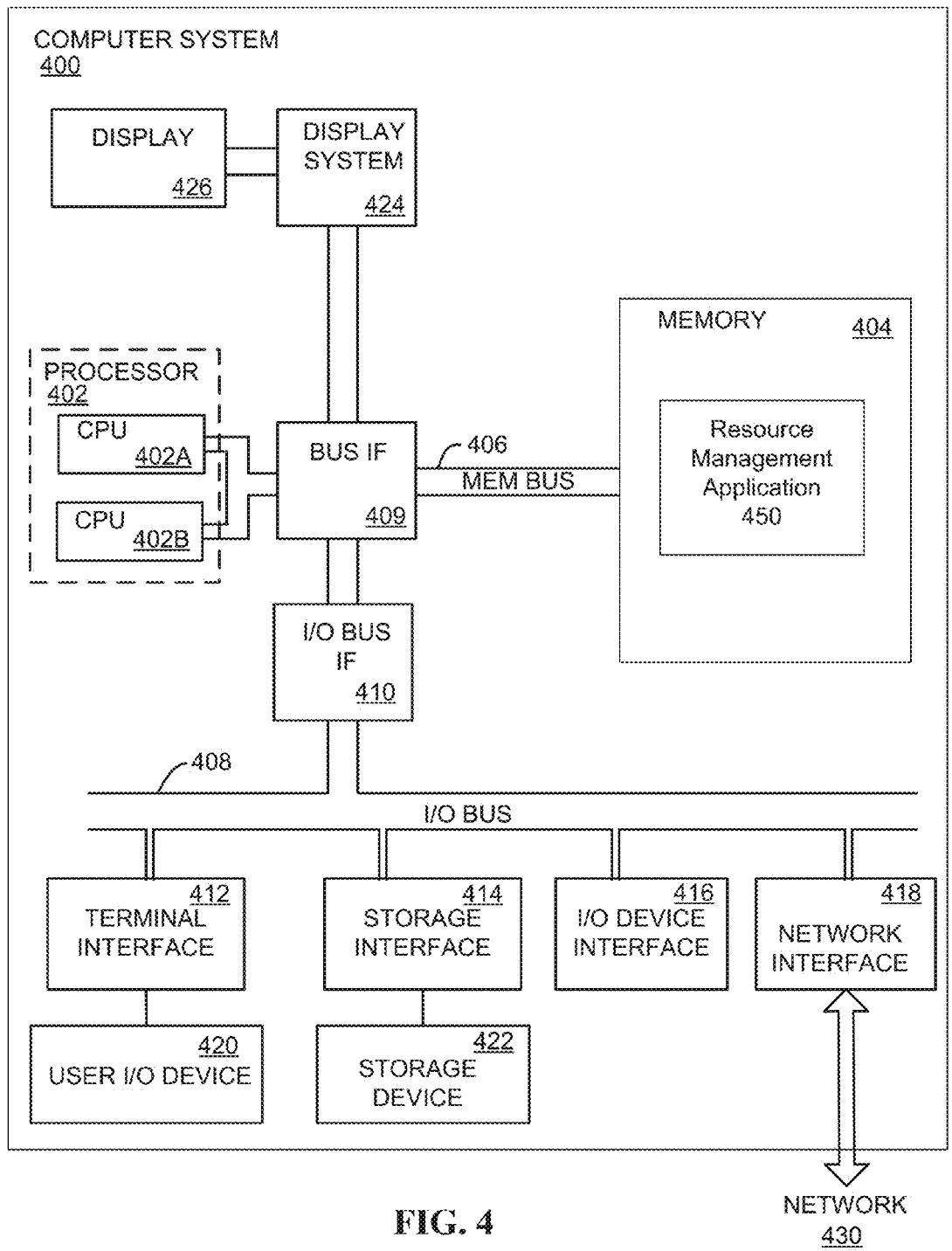
FIG. 4 depicts a high-level block diagram of a computer system for implementing various embodiments, according to embodiments.

FIG. 4 depicts a high-level block diagram of a computer system 400 for implementing various embodiments. The mechanisms and apparatus of the various embodiments disclosed herein apply equally to any appropriate computing system. The major components of the computer system 400 include one or more processors 402, a memory 404, a terminal interface 412, a storage interface 414, an I/O (Input/Output) device interface 416, and a network interface 418, all of which are communicatively coupled, directly or indirectly, for inter-component communication via a memory bus 406, an I/O bus 408, bus interface unit 409, and an I/O bus interface unit 410.

The computer system 400 may contain one or more general-purpose programmable central processing units (CPUs) 402A and 402B, herein generically referred to as the processor 402. In embodiments, the computer system 400 may contain multiple processors; however, in certain embodiments, the computer system 400 may alternatively be a single CPU system. Each processor 402 executes instructions stored in the memory 404 and may include one or more levels of on-board cache.

In embodiments, the memory 404 may include a random-access semiconductor memory, storage device, or storage medium (either volatile or non-volatile) for storing or encoding data and programs. In certain embodiments, the memory 404 represents the entire virtual memory of the computer system 400, and may also include the virtual memory of other computer systems coupled to the computer system 400 or connected via a network. The memory 404 can be conceptually viewed as a single monolithic entity, but in other embodiments the memory 404 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 404 may store all or a portion of the various programs, modules and data structures for processing data transfers as discussed herein. For instance, the memory 404 can store a resource management application 450. In embodiments, the resource management application 450 may include instructions or statements that execute on the processor 402 or instructions or statements that are interpreted by instructions or statements that execute on the processor 402 to carry out the functions as further described below. In certain embodiments, the resource management application 450 is implemented in hardware via semiconductor devices, chips, logical gates, circuits, circuit cards, and/or other physical hardware devices in lieu of, or in addition to, a processor-based system. In embodiments, the resource management application 450 may include data in addition to instructions or statements.

The computer system 400 may include a bus interface unit 409 to handle communications among the processor 402, the memory 404, a display system 424, and the I/O bus interface unit 410. The I/O bus interface unit 410 may be coupled with the I/O bus 408 for transferring data to and from the various I/O units. The I/O bus interface unit 410 communicates with multiple I/O interface units 412, 414, 416, and 418, which are also known as I/O processors (IOPs) or I/O adapters (IOAs), through the I/O bus 408. The display system 424 may include a display controller, a display memory, or both. The display controller may provide video, audio, or both types of data to a display device 426. The display memory may be a dedicated memory for buffering video data. The display system 424 may be coupled with a display device 426, such as a standalone display screen, computer monitor, television, or a tablet or handheld device display. In one embodiment, the display device 426 may include one or more speakers for rendering audio. Alternatively, one or more speakers for rendering audio may be coupled with an I/O interface unit. In alternate embodiments, one or more of the functions provided by the display system 424 may be on board an integrated circuit that also includes the processor 402. In addition, one or more of the functions provided by the bus interface unit 409 may be on board an integrated circuit that also includes the processor 402.

The I/O interface units support communication with a variety of storage and I/O devices. For example, the terminal interface unit 412 supports the attachment of one or more user I/O devices 420, which may include user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 420 and the computer system 400, and may receive output data via the user output devices. For example, a user interface may be presented via the user I/O device 420, such as displayed on a display device, played via a speaker, or printed via a printer.

The storage interface 414 supports the attachment of one or more disk drives or direct access storage devices 422 (which are typically rotating magnetic disk drive storage devices, although they could alternatively be other storage devices, including arrays of disk drives configured to appear as a single large storage device to a host computer, or solid-state drives, such as flash memory). In some embodiments, the storage device 422 may be implemented via any type of secondary storage device. The contents of the memory 404, or any portion thereof, may be stored to and retrieved from the storage device 422 as needed. The I/O device interface 416 provides an interface to any of various other I/O devices or devices of other types, such as printers or fax machines. The network interface 418 provides one or more communication paths from the computer system 400 to other digital devices and computer systems; these communication paths may include, e.g., one or more networks 430.

Although the computer system 400 shown in FIG. 4 illustrates a particular bus structure providing a direct communication path among the processors 402, the memory 404, the bus interface 409, the display system 424, and the I/O bus interface unit 410, in alternative embodiments the computer system 400 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 410 and the I/O bus 408 are shown as single respective units, the computer system 400 may, in fact, contain multiple I/O bus interface units 410 and/or multiple I/O buses 408. While multiple I/O interface units are shown, which separate the I/O bus 408 from various communications paths running to the various I/O devices, in other embodiments, some or all of the I/O devices are connected directly to one or more system I/O buses.

In various embodiments, the computer system 400 is a multi-user mainframe computer system, a single-user system, or a server computer or similar device that has little or no direct user interface, but receives requests from other computer systems (clients). In other embodiments, the computer system 400 may be implemented as a desktop computer, portable computer, laptop or notebook computer, tablet computer, pocket computer, telephone, smart phone, or any other suitable type of electronic device.

FIG. 4 depicts several major components of the computer system 400. Individual components, however, may have greater complexity than represented in FIG. 4, components other than or in addition to those shown in FIG. 4 may be present, and the number, type, and configuration of such components may vary. Several particular examples of additional complexity or additional variations are disclosed herein; these are by way of example only and are not necessarily the only such variations. The various program components illustrated in FIG. 4 may be implemented, in various embodiments, in a number of different manners, including using various computer applications, routines, components, programs, objects, modules, data structures, etc., which may be referred to herein as "software," "computer programs," or simply "programs."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for managing resources in an environment having a set of network devices, the method comprising:
    collecting, using a set of monitoring devices, context information with respect to a presentation;
    determining, based on the context information for the presentation, a subject matter group and a set of access rules for the set of network devices;
    identifying, based on the subject matter group, a first set of resources; and
    establishing, based on the set of access rules and the first set of resources, a first subset of the first set of resources for the set of network devices of the presentation environment;
    wherein the determining the set of access rules includes:
    identifying, by analyzing the subject matter group, a set of relevant functions of the network devices with respect to the subject matter group; and
    generating, based on the context information and the set of relevant functions of the set of network devices, the set of access rules for the set of network devices.

2. The method of claim 1, wherein the context information includes audio data, image data, and video data.

3. The method of claim 2, wherein determining the subject matter group includes:
    parsing, by a natural language processing technique configured to analyze syntactic and semantic content, the audio data, image data, and video data to identify a first concept;
    identifying, by comparing the first concept to an ontology framework, a set of related concepts; and
    grouping the first concept and the set of related concepts into the subject matter group.

4. The method of claim 1, wherein the first set of resources includes one or more entities selected from a group consisting of at least one of: a network search feature, system hardware resources, a software application, or a subject matter corpus.

5. The method of claim 1, wherein establishing, based on the set of access rules and the first set of resources, a subset of the first set of resources for the set of network devices of the presentation environment includes:
    filtering, by applying the set of access rules to the first set of resources, a first portion from the first set of resources; and
    determining, in response to filtering the first portion from the first set of resources, a second portion of the first set of resources as the first subset.

6. The method of claim 5, further comprising:
    determining, in response to filtering the first portion from the first set of resources, a third portion of the first set of resources as a second subset; and
    allocating the first subset to a first network device of the set of network devices and the second subset to a second network device of the set of network devices.

7. A method for managing resources in an environment having a set of network devices, the method comprising:
    collecting, using a set of monitoring devices, context information with respect to a presentation;
    determining, based on the context information for the presentation, a subject matter group and a set of access rules for the set of network devices;
    identifying, based on the subject matter group, a first set of resources;

establishing, based on the set of access rules and the first set of resources, a first subset of the first set of resources for the set of network devices of the presentation environment;

determining, in response to establishing the first subset of the first set of resources, a second subject matter group and a second set of access rules for the set of network devices based on the context information;

identifying, based on the second subject matter group, a second set of resources;

establishing, based on the second set of access rules and the second set of resources, a subset of the second set of resources for the set of network devices of the presentation environment; and allocating the subset of the second set of resources to the set of network devices.

8. A method for managing resources in an environment having a set of network devices, the method comprising:

collecting, using a set of monitoring devices, context information with respect to a presentation;

determining, based on the context information for the presentation, a subject matter group and a set of access rules for the set of network devices;

identifying, based on the subject matter group, a first set of resources;

establishing, based on the set of access rules and the first set of resources, a first subset of the first set of resources for the set of network devices of the presentation environment;

identifying, based on the context information for the presentation, a first objective for a network device of the set of network devices;

determining, by evaluating a progress status of the first objective, an efficiency factor for the set of access rules; and modifying, in response to determining that the efficiency factor is less than a first efficiency threshold, the set of access rules.

9. The method of claim 8, further comprising:

receiving, in response to evaluating the progress status of the first objective, a set of user ratings for the set of access rules; and defining, using a machine learning technique configured to process the set of user ratings for the set of access rules, a decision parameter for generating the set of access rules.

\* \* \* \* \*